US 6,553,345 B1

(12) United States Patent
Kuhn et al.

(10) Patent No.: US 6,553,345 B1
(45) Date of Patent: *Apr. 22, 2003

(54) UNIVERSAL REMOTE CONTROL ALLOWING NATURAL LANGUAGE MODALITY FOR TELEVISION AND MULTIMEDIA SEARCHES AND REQUESTS

(75) Inventors: Roland Kuhn, Santa Barbara, CA (US); Tony Davis, Santa Barbara, CA (US); Jean-Claude Junqua, Santa Barbara, CA (US); Yi Zhao, Goleta, CA (US); Weiying Li, Montreal (CA)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/383,762

(22) Filed: Aug. 26, 1999

(51) Int. Cl.[7] .............................................. G10L 15/22
(52) U.S. Cl. ..................... 704/275; 704/270.1; 704/257
(58) Field of Search ................................. 704/270, 275, 704/276, 257, 270.1, 271, 272, 251, 252

(56) References Cited

U.S. PATENT DOCUMENTS

| | | | |
|---|---|---|---|
| 5,774,859 A | | 6/1998 | Houser et al. |
| 5,878,385 A | | 3/1999 | Bralich et al. |
| 6,246,981 B1 | * | 6/2001 | Papineni et al. ............ 704/235 |
| 6,324,512 B1 | * | 11/2001 | Junqua et al. .............. 704/231 |
| 6,330,539 B1 | * | 12/2001 | Takayama et al. .......... 704/251 |

FOREIGN PATENT DOCUMENTS

| | | |
|---|---|---|
| DE | 40 29 697 A1 | 7/1991 |
| EP | 0 838 945 A2 | 4/1998 |
| EP | 1 033 701 A2 | 9/2000 |
| EP | 1 037 463 A2 | 9/2000 |
| WO | WO 97/48230 | 12/1997 |
| WO | WO 98/16062 | 4/1998 |

OTHER PUBLICATIONS

Junqua, Jean–Claude and Haton, Jean–Paul; "Robustness in Automatic Speech Recognition"; Kluwer Academic Publishers; Norwell, MA; 1996; pp. 353–369.

* cited by examiner

Primary Examiner—Marsha D. Banks-Harold
Assistant Examiner—Abul K. Azad
(74) Attorney, Agent, or Firm—Harness, Dickey & Pierce, PLC

(57) ABSTRACT

The remote control unit supports multi-modal dialog with the user, through which the user can easily select programs for viewing or recording. The remote control houses a microphone into which the user can input natural language speech. The input speech is recognized and interpreted by a natural language parser that extracts the semantic content of the user's speech. The parser works in conjunction with an electronic program guide, through which the remote control system is able to ascertain what programs are available for viewing or recording and supply appropriate prompts to the user. In one embodiment, the remote control includes a touch screen display upon which the user may view prompts or make selections by pen input or tapping. Selections made on the touch screen automatically limit the context of the ongoing dialog between user and remote control, allowing the user to interact naturally with the unit. The remote control unit can control virtually any audio-video component, including those designed before the current technology. The remote control system can be packaged entirely within the remote control handheld unit, or components may be distributed in other systems attached to the user's multimedia equipment.

26 Claims, 3 Drawing Sheets

UNIVERSAL REMOTE CONTROL ALLOWING NATURAL LANGUAGE MODALITY FOR TELEVISION AND MULTIMEDIA SEARCHES AND REQUESTS

This application is related to U.S. Pat. No. 6,324,512 issued on Nov. 27, 2001 and entitled "System and Method for Allowing Family Members to Access TV Contents and Program Media Recorder Over Telephone Or Internet".

BACKGROUND AND SUMMARY OF THE INVENTION

The ubiquitous remote control, often a multitude of them, has found its way onto virtually every coffee table in the television viewing rooms throughout the world. Few television viewers have not experienced the frustration of trying to perform even a simple command, such as turning on the television and watching a pre-recorded movie, only to be thwarted because he or she cannot figure out which button or buttons to press on which remote control units.

In an attempt to address the proliferation of multiple remote controls, many companies offer a universal remote control that is able to operate a variety of different audio-video components. These remote controls, of necessity, feature a panoply of buttons, many of them having dual functions, in order to control the principal functions of all devices in the user's multimedia setup.

While the conventional universal remote control may eliminate the need for having multiple remote control units on the coffee table, it does little to simplify the user's interaction with his or her audio-video or multimedia system. On the contrary most universal remote control units are so complex that they actually impede the user's ability to control the equipment.

The present invention tackles this problem through speech technology recognition and sophisticated natural language parsing components, that allows the user to simply speak into the remote control unit and have his or her commands carried out. While the spoken commands can be simple commands such as "Play VCR" or "Record Channel 6", the natural language parser offers far more complex commands than this. For example, the user could speak: "Show me a funny movie starring Marilyn Monroe." Using the speech recognition and parser components, the system will search through an electronic program guide or movie database and can respond to the user (for instance) that "Some Like It Hot" will be playing next Friday. The user could then, for example, instruct the system to record that movie when it comes on.

Recording commands need not be limited to the entire movie or program. Rather, the user could enter a command such as: "Record the last five minutes of tonight's Toronto-Los Angeles baseball game." Again, the speech recognition and parser components convert this complex command into a sequence of actions that cause the recording device in the user's system to make the requested recording at the appropriate time.

The remote control of the invention can be constructed as a self-contained unit having all of the parser and speech recognition components on board, or it may be manufactured in multiple components, allowing some of the more complex computational operations to be performed by a processor located in a television set, set top box, or auxiliary multimedia control unit. In the latter case, the hand-held remote and the remote command unit communicate with each other by wireless transmission. Preferably, the hand-held remote control unit includes an infrared port through which the remote control can interact with older equipment in the user's multimedia setup. Thus the remote control of the invention even allows sophisticated natural language speech commands to be given to those older audio-video components.

For a more complete understanding of the invention, its objects and advantages, refer to the following specification and to the accompanying drawings.

DESCRIPTION OF THE PREFERRED EMBODIMENTS

Figure 1:
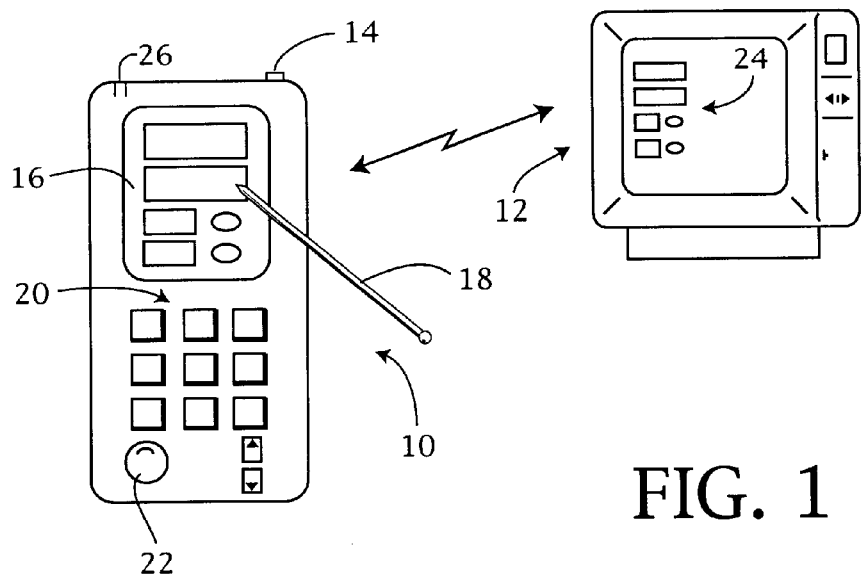
FIG. 1 is a plan view of an embodiment of the remote control in accordance with the invention.

The remote control of the invention can take many forms. An exemplary embodiment is illustrated in FIG. 1, where the remote control is shown at 10 and an exemplary television set is shown at 12. In the preferred embodiment the remote control 10 and television 12 communicate wirelessly with one another through suitable radio frequency link or infrared link.

The remote control is designed to operate not only more modern digital interactive television and hard disk recorder equipment, but also older models of televisions, VCRs, DVD and laser disk players, surround sound processors, tuners, and the like. Accordingly, the remote control includes a light-emitting diode transmitter 14 with which the unit may communicate with all popular home entertainment and multimedia components. This same transmitter can serve as the communication link between the remote control and the television (to implement some of the features described herein).

In an alternate embodiment, the remote control 10 and television 12 communicate through a bidirectional data communication link that allows the speech recognition and natural language parsing components to be distributed among the remote control, television and optionally other components within the multimedia system.

Although not required to implement the speech-enabled dialog system, the presently preferred remote control 10 also includes a lighted display 16 that may supply prompts to the user as well as information extracted from the electronic program guide. The screen may be touch sensitive or tap sensitive, allowing the user to select menu options and provide handwritten input through the stylus 18. Users who regularly employ pen-based personal digital assistant (PDA) devices will find the stylus input modality particularly useful.

The remote control 10 also includes a complement of pushbuttons 20, for performing numeric channel selection and other commonly performed operations, such as increasing and decreasing the audio volume. A jog shuttle wheel 22 may also be included, to allow the user to use this feature in conjunction with recorders and disk players.

By virtue of the bi-directional link between remote control 10 and television 12, the system is capable of displaying on-screen prompts and program guide information on both the television monitor screen, as illustrated at 24, and on the display screen 16 of the remote control. If desired, the on-screen display 24 can be suppressed, so that the user may make menu item selections and electronic program guide selections using the remote control screen, without the need to display the same information on the television while watching a program.

A particularly useful aspect of remote control 10 is its natural language speech modality. The remote control is provided with a microphone as at 26. The user speaks in natural language sentences, and these spoken utterances are picked up by microphone 26 and supplied to a sophisticated speech understanding system. The speech understanding system allows the user to give the television set and other associated equipment (such as hard disk recorders or VCR recorders) search and record commands in interactive, natural language.

As an example of a spoken search command, the user could say into the microphone, "Show me a funny movie starring Marilyn Monroe." Using its speech recognition and parser components, this system searches through an electronic program guide or movie database and responds to the user whether any options meet the user's request. The system might respond, for instance, that "Some Like It Hot" will be playing next Friday.

Armed with this information, the user may elect to record the movie, by simply speaking, "Please record Some Like It Hot."

Recording instructions can be quite explicit, thanks to the sophisticated natural language system of the invention. Thus, the user could enter a complex record command such as, "Record the last five minutes of tonight's Toronto-LosAngeles baseball game." Again, the speech recognition and parser components convert this complex command into a sequence of actions that the recorder within the system will carry out.

Figure 2:
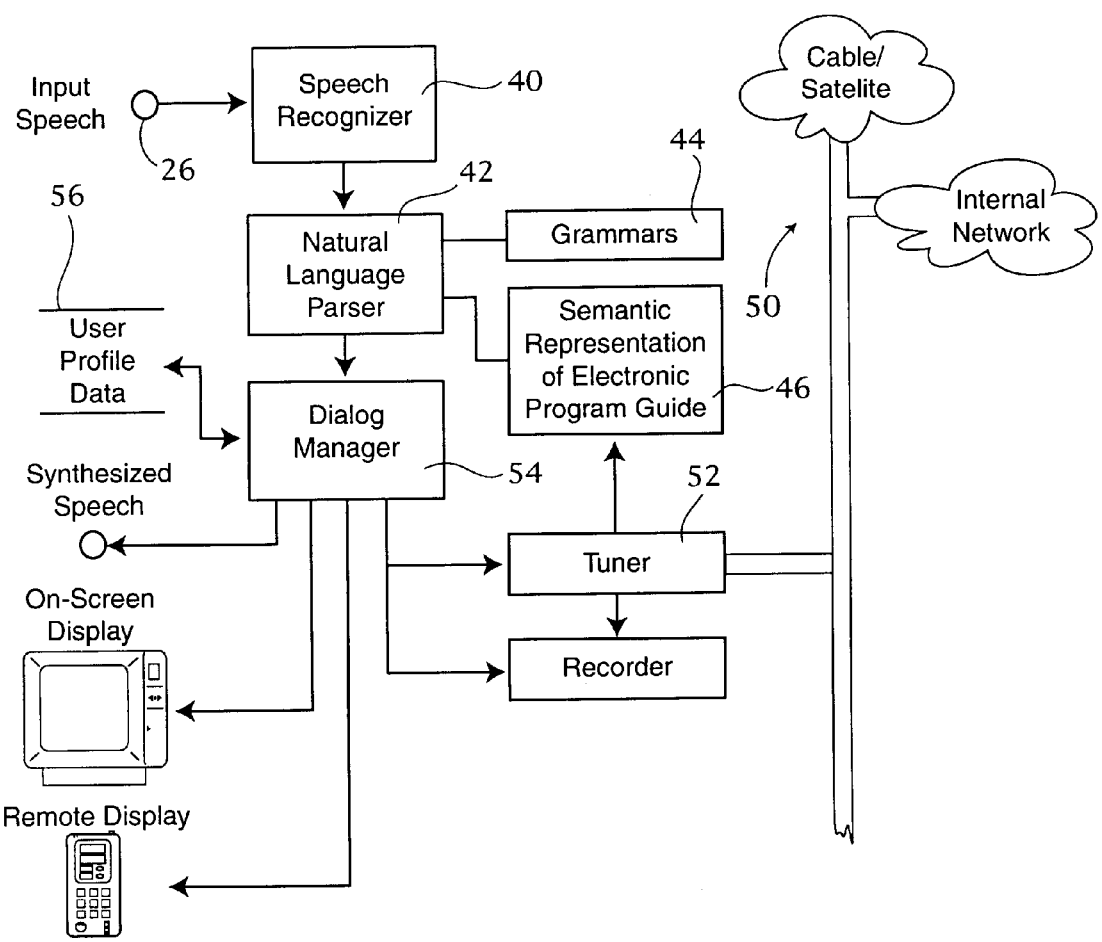
FIG. 2 is a block diagram illustrating the components of the presently preferred embodiment.

Referring to FIG. 2, the major functional components of the remote control system will now be described. In this regard, it is important to understand that the components of the remote control system can be packaged entirely within the remote control device itself, or one or more of these components can be distributed or implemented in other components within the system. The more processor-intensive functions of the system may be performed, for example, by processors located in larger, more powerful components such as set top boxes, interactive digital television sets, multimedia recording systems, and the like.

For example, the microphone and basic components of the speech recognizer may be housed in the remote control unit, with the remaining components housed in another piece of equipment. If desired, the speech recognizer itself can be subdivided into components, some of which are housed in the remote control and others of which are housed elsewhere. By way of example, the component housed in the remote control may process the input speech by extracting speech features upon which the speech models are trained. The remote control then transmits these extracted features to the component located elsewhere for further speech recognition processing. Alternatively, the input speech may simply be transmitted by the remote control in the audio domain to a speech recognition component located elsewhere. These are of course only a few possible examples of how the functionality of the invention may be deployed in distributed fashion.

Speech input supplied through microphone 26 is first digitized and fed to speech recognizer module 40. The output of speech recognizer module 40 is supplied to the natural language parser 42. This parser works in conjunction with a set of grammars 44 that allow the system to interpret the meaning behind the user's spoken instructions. In the presently preferred embodiment these grammars are goal-oriented grammars comprising a collection of frame sentences having one or more slots that the system will fill in based upon the words recognized from the users input speech. More detail about the presently preferred parser and these goal-oriented grammars is presented below.

The natural language parser 42 has access to a stored semantic representation of the electronic program guide 46. The electronic program guide can be downloaded from the internet or supplied via the entertainment system's cable or satellite link. These sources of electronic program guide information are illustrated generally at 50. Typically, the television tuner 52 may be used to obtain this information and furnish it to the semantic representation stored at 46. Alternatively, this information could be supplied by telephone connection to a suitable Internet service provider or dedicated electronic program guide service provider.

The typical electronic program guide represents a complex hierarchial structure that breaks down different types of program content according to type. Thus a program guide may divide programs into different categories, such as movies, sports, news, weather, and the like. These categories may further be subdivided. Thus movies may be subdivided into categories such as comedies, drama, science fiction and so forth. A semantic representation of the electronic program guide contents is stored at 46, based on the same goal-oriented grammar structure used by the natural language parser. This allows the parser to readily find information about what is available for viewing. If the user has asked for comedy movies, the comedy movie portion of the semantic representation is accessed by the parser, and the available programs falling under this category may then be displayed to the user as will be more fully described below.

In some instances the natural language parser will immediately identify a program the user is interested in watching. In other instances, there may be multiple choices, or no choices. To accommodate these many possibilities, the system includes a dialog manager 54. The dialog manager interfaces with the natural language parser 42, and generates interactive prompts for synthesized speech or on-screen presentation to the user. These prompts are designed to elicit further information from the user, to help the natural language parser find program offerings the user may be interested in. The dialog manager has a user profile data store 56, which stores information about the user's previous information selections, and also information about how the user likes to have the information displayed. This data store thus helps the dialog manager tune its prompts to best suit the user's expectations.

Figure 3:
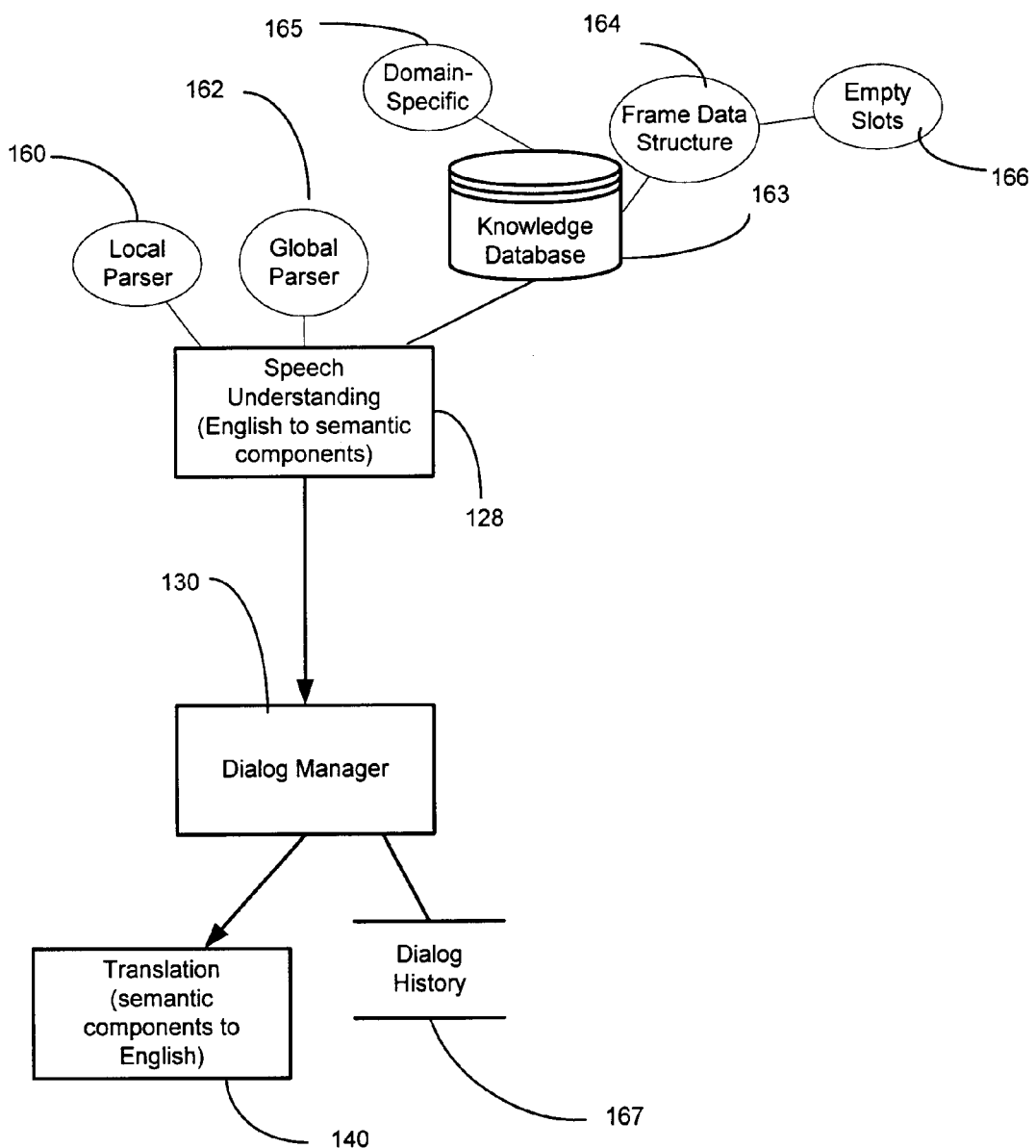
FIG. 3 is a block diagram depicting the components of the natural language parser of the presently preferred embodiment of the invention.

The presently preferred natural language parser will now be described. FIG. 3 depicts components of the natural language parser 42 in more detail. In particular, speech understanding module 128 includes a local parser 160 to identify predetermined relevant task-related fragments. Speech understanding module 128 also includes a global parser 162 to extract the overall semantics of the speaker's request.

The local parser 160 utilizes in the preferred embodiment small and multiple grammars along with several passes and a unique scoring mechanism to provide parse hypotheses. For example, the novel local parser 102 recognizes according to this approach phrases such as dates, names of people, and movie categories. If a speaker utters "record me a comedy in which Mel Brooks stars and is shown before January 23rd", the local parser recognizes: "comedy" as being a movie category; "January 23rd" as a date; and "Mel Brooks" as an actor. The global parser assembles those items (movie category, date, etc.) together and recognizes that the speaker wishes to record a movie with certain constraints.

Speech understanding module 128 includes knowledge database 163 which encodes the semantics of a domain (i.e., goal to be achieved). In this sense, knowledge database 163 is preferably a domain-specific database as depicted by reference numeral 165 and is used by dialog manager 130 to determine whether a particular action related to achieving a predetermined goal is possible.

The preferred embodiment encodes the semantics via a frame data structure 164. The frame data structure 164 contains empty slots 166 which are filled when the semantic interpretation of global parser 162 matches the frame. For example, a frame data structure (whose domain is tuner commands) includes an empty slot for specifying the viewer-requested channel for a time period. If viewer 120 has provided the channel, then that empty slot is filled with that information. However, if that particular frame needs to be filled after the viewer has initially provided its request, then dialog manager 130 instructs computer response module 134 to ask viewer 120 to provide a desired channel.

The frame data structure 164 preferably includes multiple frames which each in turn have multiple slots. One frame may have slots directed to attributes of a movie, director, and type of movie. Another frame may have slots directed to attributes associated with the time in which the movie is playing, the channel, and so forth.

The following reference discusses global parsers and frames: R. Kuhn and R. D. Mori, *Spoken Dialogues with Computers* (Chapter 14: Sentence Interpretation), Academic Press, Boston (1998).

Dialog manager 130 uses dialog history data file 167 to assist in filling in empty slots before asking the speaker for the information. Dialog history data file 167 contains a log of the conversation which has occurred through the device of the present invention. For example, if a speaker utters "I'd like to watch another Marilyn Monroe movie," the dialog manager 130 examines the dialog history data file 167 to check what movies the user has already viewed or rejected in a previous dialog exchange. If the speaker had previously rejected "Some Like It Hot", then the dialog manager 130 fills the empty slot of the movie title with movies of a different title. If a sufficient number of slots have been filled, then the present invention will ask the speaker to verify and confirm the program selection. Thus, if any assumptions made by the dialog manager 130 through the use of dialog history data file 167 prove to be incorrect, then the speaker can correct the assumption.

The natural language parser 42 analyzes and extracts semantically important and meaningful topics from a loosely structured, natural language text which may have been generated as the output of an automatic speech recognition system (ASR) used by a dialogue or speech understanding system. The natural language parser 42 translates the natural language text input to a new representation by generating well-structured tags containing topic information and data, and associating each tag with the segments of the input text containing the tagged information. In addition, tags may be generated in other forms such as a separate list, or as a semantic frame.

Robustness is a feature of the natural language parser 42 as the input can contain grammatically incorrect English sentences, due to the following reasons: the input to the recognizer is casual, dialog style, natural speech can contain broken sentences, partial phrases, and the insertion, omission, or misrecognition of errors by the speech recognizer even when the speech input is considered correct. The natural language parser 42 deals robustly with all types of input and extracts as much information as possible.

Figure 4:
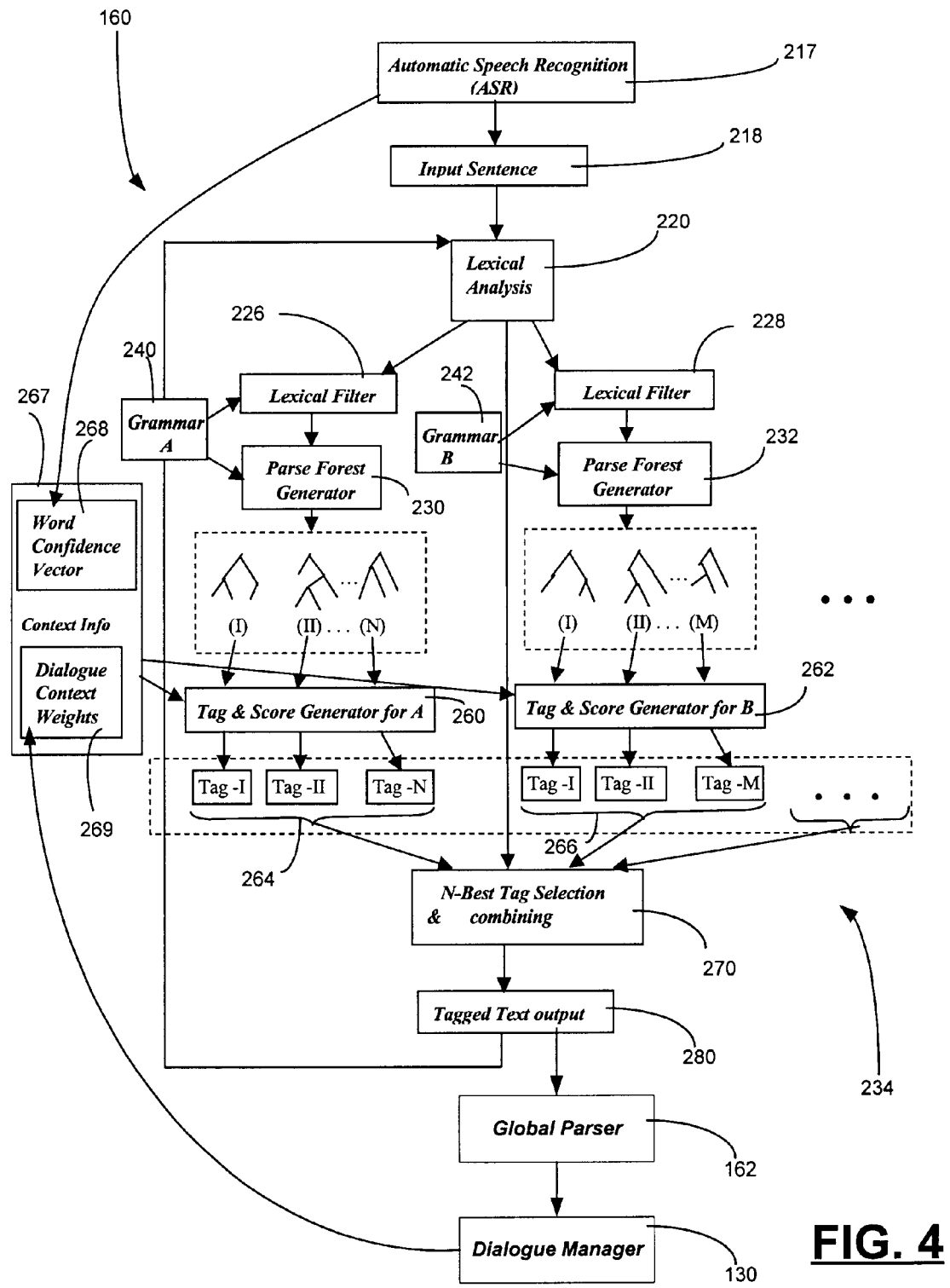
FIG. 4 is a block diagram depicting the components of the local parser of the presently preferred embodiment of the invention.

FIG. 4 depicts the different components of the local parser 160 of the natural language parser 42. The natural language parser 42 preferably utilizes generalized parsing techniques in a multi-pass approach as a fixed-point computation. Each topic is described as a context-sensitive LR (left-right and rightmost derivation) grammar, allowing ambiguities. The following are references related to context-sensitive LR grammars: A. Aho and J. D. Ullman, Principles of Compiler Design, Addison Wesley Publishing Co., Reading, Mass. (1977); and N. Tomita, Generalized LR Parsing, Kluwer Academic Publishers, Boston, Mass. (1991).

At each pass of the computation, a generalized parsing algorithm is used to generate preferably all possible (both complete and partial) parse trees independently for each targeted topic. Each pass potentially generates several alternative parse-trees, each parse-tree representing a possibly different interpretation of a particular topic. The multiple passes through preferably parallel and independent paths result in a substantial elimination of ambiguities and overlap among different topics. The generalized parsing algorithm is a systematic way of scoring all possible parse-trees so that the (N) best candidates are selected utilizing the contextual information present in the system.

Local parsing system 160 is carried out in three stages: lexical analysis 220; parallel parse-forest generation for each topic (for example, generators 230 and 232); and analysis and synthesis of parsed components as shown generally by reference numeral 234.

Lexical Analysis:

A speaker utters a phrase that is recognized by an automatic speech recognizer 217 which generates input sentence 218. Lexical analysis stage 220 identifies and generates tags for the topics (which do not require extensive grammars) in input sentence 218 using lexical filters 226 and 228. These include, for example, movie names; category of movie; producers; names of actors and actresses; and the like. A regular-expression scan of the input sentence 218 using the keywords involved in the mentioned exemplary tags is typically sufficient at this level. Also, performed at this stage is the tagging of words in the input sentence that are not part of the lexicon of particular grammar. These words are indicated using an X-tag so that such noise words are replaced with the letter "X".

Parallel Parse-forest Generation:

The parser 42 uses a high-level general parsing strategy to describe and parse each topic separately, and generates tags and maps them to the input stream. Due to the nature of unstructured input text 218, each individual topic parser preferably accepts as large a language as possible, ignoring all but important words, dealing with insertion and deletion errors. The parsing of each topic involves designing context-sensitive grammar rules using a meta-level specification language, much like the ones used in LR parsing. Examples of grammars include grammar A 240 and grammar B 242. Using the present invention's approach, topic grammars 240 and 242 are described as if they were an LR-type grammar, containing redundancies and without eliminating shift and reduce conflicts. The result of parsing an input sentence is all possible parses based on the grammar specifications.

Generators 230 and 232 generate parse forests 250 and 252 for their topics. Tag-generation is done by synthesizing actual information found in the parse tree obtained during parsing. Tag generation is accomplished via tag and score generators 260 and 262 which respectively generate tags 264 and 266. Each identified tag also carries information about what set of input words in the input sentence are covered by the tag. Subsequently the tag replaces its cover-set. In the preferred embodiment, context information 267 is utilized for tag and score generations, such as by generators 260 and 262. Context information 267 is utilized in the scoring heuristics for adjusting weights associated with a heuristic scoring factor technique that is discussed below. Context information 267 preferably includes word confidence vector 268 and dialogue context weights 269. However, it should be understood that the parser 42 is not limited to using both word confidence vector 268 and dialogue context weights 269, but also includes using one to the exclusion of the other, as well as not utilizing context information 267.

Automatic speech recognition process block 217 generates word confidence vector 268 which indicates how well the words in input sentence 218 were recognized. Dialog manager 130 generates dialogue context weights 269 by determining the state of the dialogue. For example, dialog manager 130 asks a user about a particular topic, such as, what viewing time is preferable. Due to this request, dialog manager 130 determines that the state of the dialogue is time-oriented. Dialog manager 130 provides dialogue context weights 269 in order to inform the proper processes to more heavily weight the detected time-oriented words.

Synthesis of Tag-components:

The topic spotting parser of the previous stage generates a significant amount of information that needs to be analyzed and combined together to form the final output of the local parser. The parser 42 is preferably as "aggressive" as possible in spotting each topic resulting in the generation of multiple tag candidates. Additionally in the presence of numbers or certain key-words, such as "between", "before", "and", "or", "around", etc., and especially if these words have been introduced or dropped due to recognition errors it is possible to construct many alternative tag candidates. For example, an input sentence could have insertion or deletion errors. The combining phase determines which tags form a more meaningful interpretation of the input. The parser 42 defines heuristics and makes a selection based on them using a N-Best candidate selection process. Each generated tag corresponds to a set of words in the input word string, called the tag's cover-set.

A heuristic is used that takes into account the cover-sets of the tags used to generate a score. The score roughly depends.on the size of the cover-set, the sizes in the number of the words of the gaps within the covered items, and the weights assigned to the presence of certain keywords. In the preferred embodiment, ASR-derived confidence vector and dialog context information are utilized to assign priorities to the tags. For example applying channel-tags parsing first potentially removes channel-related numbers that are easier to identify uniquely from the input stream, and leaves fewer numbers to create ambiguities with other tags. Preferably, dialog context information is used to adjust the priorities.

N-Best Candidates Selection

At the end of each pass, an N-best processor 270 selects the N-best candidates based upon the scores associated with the tags and generates the topic-tags, each representing the information found in the corresponding parse-tree. Once topics have been discovered this way, the corresponding words in the input can be substituted with the tag information. This substitution transformation eliminates the corresponding words from the current input text. The output 280 of each pass is fed-back to the next pass as the new input, since the substitutions may help in the elimination of certain ambiguities among competing grammars or help generate better parse-trees by filtering out overlapping symbols.

Computation ceases when no additional tags are generated in the last pass. The output of the final pass becomes the output of the local parser to global parser 162. Since each phase can only reduce the number of words in its input and the length of the input text is finite, the number of passes in the fixed-point computation is linearly bounded by the size of its input.

The following scoring factors are used to rank the alternative parse trees based on the following attributes of a parse-tree:

Number of terminal symbols.
Number of non-terminal symbols.
The depth of the parse-tree.
The size of the gaps in the terminal symbols.
ASR-Confidence measures associated with each terminal symbol.
Context-adjustable weights associated with each terminal and non-terminal symbol.

Each path preferably corresponds to a separate topic that can be developed independently, operating on a small amount of data, in a computationally inexpensive way. The architecture of the parser 42 is flexible and modular so incorporating additional paths and grammars, for new topics, or changing heuristics for particular topics is straight forward, this also allows developing reusable components that can be shared among different systems easily.

From the foregoing it will be appreciated that the remote control system of the invention offers a great deal of user-friendly functionality not currently found in any electronic program guide control system or remote control system. While the invention has been described in its presently preferred embodiment, it will be understood that the invention is capable of modification without departing from the spirit of the invention as set forth in the appended claims.

What is claimed is:

1. A remote control system for controlling at least one audio/video component comprising:

a handheld case;

a microphone disposed in said case for receiving speech input from a user;

a communication system disposed in said case for transmitting data signals to a location remote from said handheld case;

a speech recognizer for processing said speech input;

a memory for storing a semantic representation of an electronic program guide; and a natural language parser in communication with said speech recognizer and with said memory, said parser being operative to extract semantic content from said processed speech input and to access semantic representation of said electronic program guide using said extracted semantic content to generate control instructions for said audio/video component such that the natural language parser is a task-based parser employing a grammar comprising a plurality of frames having slots representing semantic structure of said electronic program guide, wherein the natural language parser further comprises a local parser adapted to identify predetermined task-related fragments in said speech input, and a global parser adapted to receive task-related fragments and to extract overall semantics from the task-related fragments.

2. The remote control system of claim 1 wherein said speech recognizer is disposed within said handheld case.

3. The remote control system of claim 1 further comprising:
a processor component remote from said handheld case and wherein said speech recognizer is disposed in said processor component.

4. The remote control system of claim 1 wherein said natural language parser is disposed within said handheld case.

5. The remote control system of claim 1 further comprising:
a processor component remote from said handheld case and wherein said natural language parser is disposed in said processor component.

6. The remote control system of claim 1 further comprising:
an electronic program guide acquisition system coupled to said memory for downloading said representation of an electronic program guide via a telecommunications link.

7. The remote control system of claim 6 wherein said telecommunications link is the internet.

8. The remote control system of claim 6 wherein said telecommunications link is an audio/video program content delivery system.

9. The remote control system of claim 1 wherein said audio/video component includes a tuner and wherein said remote control system communicates with said tuner to acquire said representation of an electronic program guide.

10. The remote control system of claim 1 further comprising:
a dialog manager in communication with said parser for generating prompts to the user based on said extracted semantic content.

11. The remote control system of claim 1 further comprising:
a dialog manager having speech synthesizer for generating speech prompts to the user based on said extracted semantic content.

12. The remote control system of claim 1 further comprising:
a digitizing tablet disposed in said handheld case for pen-based input of user-supplied information.

13. The remote control system of claim 12 wherein said digitizing tablet displays prompts that are actuable by pen to limit the context in which said parser extracts semantic content.

14. The remote control system of claim 1 further comprising:
display unit disposed in said handheld case for providing information to the user.

15. A remote control device comprising:
a handheld case having a communication interface through which control instructions are issued to a remote component;
a display screen disposed in said case;
a microphone disposed in said case;
a speech recognizer system coupled to said microphone;
a user profile data store for storing information selected from the group consisting of prior use information, preference information and combinations thereof;
a dialog manager coupled to said speech recognizer system, to said user profile data store, and to said display screen for issuing control commands through said communication interface and for displaying information on said display screen based at least in part on information obtained from said user profile data store; and
a natural language parser in communication with said speech recognizer system, said parser being operative to extract a semantic content from said processed speech input and to access semantic representation of an electronic program guide and using said extracted semantic content to generate control instructions for said remote control, such that the natural language parser is a task-based parser employing a grammar comprising a plurality of frames having slots representing semantic structure of said electronic program guide, wherein the natural language parser further comprises a local parser adapted to identify predetermined task-related fragments in speech input received from said microphone, and a global parser adapted to receive task-related fragments and to extract overall semantics from the task-related fragments.

16. The remote control device of claim 15 wherein said natural language parser having an associated data store containing a representation of said electronic program guide, and wherein said natural language parser selectively extracts information from said program guide based on speech information input received through said microphone.

17. The remote control device of claim 15 wherein said speech recognizer system includes a data store containing a representation of said electronic program guide and a system for selectively updating the contents of said data store.

18. The remote control device of claim 17 wherein said system for selectively updating the contents of said data store includes a tuner for accessing a source of electronic program guide information.

19. The remote control device of claim 17 wherein said system for selectively updating the contents of said data store includes an internet access system for accessing a source of electronic program guide information.

20. The remote control device of claim 15 wherein said speech recognizer has a first component disposed in said handheld case and a second component disposed outside said handheld case.

21. The remote control device of claim 20 wherein said first component generates an audio domain signal for transmission to said second component.

22. The remote control device of claim 20 wherein said first component extracts speech parameters from input speech from a user and transmits said parameters to said second component for recognition.

23. The remote control device of claim 1 wherein said speech recognizer has a first component disposed in said handheld case and a second component disposed outside said handheld case.

24. The remote control device of claim 23 wherein said first component generates an audio domain signal for transmission to said second component.

25. The remote control device of claim 23 wherein said first component extracts speech parameters from input speech from a user and transmits said parameters to said second component for recognition.

26. A remote control system for controlling at least one audio-video component comprising:
a handheld case;
a microphone disposed in said case for receiving speech input from a user;

a communication system disposed in said case for transmitting data signals to a location remote from said handheld case;

a speech recognizer for converting said speech input to text output;

a memory for storing a semantic representation of an electronic program guide;

a natural language parser in communication with said speech recognizer and with said memory, said parser being operative to extract semantic content from said processed speech input and to access semantic representation of said electronic program guide using said extracted semantic content to generate control instructions for said audio/video component, such that the natural language parser is a task-based parser employing a grammar comprising a plurality of frames having slots representing semantic structure of said electronic program guide, wherein the natural language parser further comprises a local parser adapted to identify predetermined task-related fragments in said speech input, and a global parser adapted to receive task-related fragments and to extract overall semantics from the task-related fragments.

* * * * *